US012507668B2

(12) United States Patent
Chikamori

(10) Patent No.: US 12,507,668 B2
(45) Date of Patent: Dec. 30, 2025

(54) SLAT UNIT FOR LIVESTOCK BARN

(71) Applicant: U-CHIKA CORPORATION, Kochi (JP)

(72) Inventor: Takeshi Chikamori, Kochi (JP)

(73) Assignee: U-CHIKA CORPORATION, Kochi (JP)

( * ) Notice: Subject to any disclaimer, the term of this patent is extended or adjusted under 35 U.S.C. 154(b) by 280 days.

(21) Appl. No.: 17/273,377

(22) PCT Filed: Oct. 8, 2020

(86) PCT No.: PCT/JP2020/038207
§ 371 (c)(1),
(2) Date: Mar. 4, 2021

(87) PCT Pub. No.: WO2021/186775
PCT Pub. Date: Sep. 23, 2021

(65) Prior Publication Data
US 2022/0110293 A1     Apr. 14, 2022

(30) Foreign Application Priority Data
Mar. 19, 2020   (JP) ................................. 2020-050256

(51) Int. Cl.
*A01K 1/015*     (2006.01)
(52) U.S. Cl.
CPC ................................. *A01K 1/0151* (2013.01)
(58) Field of Classification Search
CPC .................................................. A01K 1/0151
(Continued)

(56) References Cited

U.S. PATENT DOCUMENTS 544,204 A * 8/1895 Andrews ................. E04F 15/10
52/177
846,291 A * 3/1907 Emerson ............ A47G 27/0218
52/666
(Continued)

FOREIGN PATENT DOCUMENTS

FR           1491909 A      8/1967
JP        H08-322414 A     12/1996
(Continued)

OTHER PUBLICATIONS

Translation of JP-H08322414-A (Year: 1996).*
(Continued)

*Primary Examiner* — Monica L Perry
*Assistant Examiner* — Brittany A Lowery
(74) *Attorney, Agent, or Firm* — WHDA, LLP

(57) ABSTRACT

The present disclosure provides a slat unit for a livestock barn that significantly reduces efforts in a laying operation and that is hygienic and highly durable. A slat unit 10 for a livestock barn made of stainless steel that is a preferable floor material at an excretion area in a livestock barn includes at least a plurality of elongated slat panels 12, one or more horizontal members 14 that connect the plurality of slat panels 12 arranged side by side in a crosswise direction and in parallel in a longitudinal direction of each slat panel 12. Both longitudinal sides of each of the slat panels 12 are mountain-folded to form side wall portions 16. An angle between a planar portion 15 of each of the slat panels 12 and the respective side wall portions 16 is smaller than 90°.

18 Claims, 16 Drawing Sheets

(58) Field of Classification Search
USPC .................................................. 52/119, 436
See application file for complete search history.

(56) References Cited

U.S. PATENT DOCUMENTS

| | | | | |
|---|---|---|---|---|
| 3,230,931 | A * | 1/1966 | Taylor | A01K 1/0151 |
| | | | | 119/529 |
| 3,913,291 | A * | 10/1975 | Dulien | A47L 23/24 |
| | | | | 52/666 |
| 4,135,339 | A * | 1/1979 | Pawlitschek | A01K 1/0151 |
| | | | | 119/508 |
| 4,198,795 | A * | 4/1980 | Barnidge | E04F 15/06 |
| | | | | 52/180 |
| 4,320,719 | A * | 3/1982 | Clemmesen | A01K 1/0151 |
| | | | | 119/448 |
| 4,438,726 | A * | 3/1984 | Osthoff | A01K 1/0151 |
| | | | | 52/669 |
| 4,522,009 | A * | 6/1985 | Fingerson | E04C 2/425 |
| | | | | 52/309.3 |
| 5,291,704 | A * | 3/1994 | Savorani | E02D 29/14 |
| | | | | 52/177 |
| 5,351,458 | A * | 10/1994 | Lehe | A01K 1/015 |
| | | | | 52/177 |
| 7,007,437 | B2 * | 3/2006 | Thomas | E04F 15/02183 |
| | | | | 52/510 |
| 7,310,919 | B2 * | 12/2007 | Grossman | B65D 88/742 |
| | | | | 52/537 |
| 2018/0347215 | A1 * | 12/2018 | Rus | E04G 21/30 |

FOREIGN PATENT DOCUMENTS

| | | |
|---|---|---|
| JP | 2001-320995 A | 11/2001 |
| WO | 2004/068937 A2 | 8/2004 |

OTHER PUBLICATIONS

Translation of DE_202013005924_U1 (Year: 2013).*
Translation of FR 2870868 A1 (Year: 2005).*
"Stainless steel drainboard 'clean'", Internet URL: http://www.u-chika.com/stainless-sunoko.html, May 24, 2019, retrieved on Nov. 6, 2020, 8 pages (cited in the ISR; cited in Declaration as to Non-prejudicial Disclosures or Exceptions to Lack of Novelty in Int'l Appl. No. PCT/JP2020/038207; w/ English machine translation).
International Search Report dated Nov. 24, 2020, issued in counterpart International Application No. PCT/JP2020/038207 (2 pages; in English ).
Joho et al., "U-Chika's stainless steel slat unit 'Kirei' Ver.2.", Monthly Swine Magazine, vol. 47, No. 6, Serial No. 533, Jun. 1, 2019, pp. 48-51 (cited in Declaration as to Non-prejudicial Disclosures or Exceptions to Lack of Novelty in Int'l Appl. No. PCT/JP2020/038207; w/ English translation).
English translation of "Declaration as to Non-prejudicial Disclosures or Exceptions to Lack of Novelty" under PCT Rules 4.17(v), 51bis. 1, 51bis.2, as submitted in the counterpart International Application No. PCT/JP2020/038207 filed on Oct. 8, 2020 (2 pages).

* cited by examiner

SLAT UNIT FOR LIVESTOCK BARN

TECHNICAL FIELD

The present invention relates to a stainless steel slat unit for a livestock barn.

BACKGROUND ART

In recent years, various types of slat units (or slats) for livestock barns have been available on the market, including metal slats and plastic slats. Among the commercially available varieties, concrete slats have become widespread because of their advantage of causing moderate trimming of claws of livestock animals, and have been practically satisfactory.

However, the concrete slats have various issues such as poor finishing due to inclusion of air bubbles during manufacture, occurrence of chipping during transportation or installation, and injuries on livestock animals due to a chipped part.

One of the conventional techniques to address these issues is to provide a slat unit for a livestock barn composed of an ultra-high strength concrete hardened body (see Patent Literature 1). The slat unit for the livestock barn disclosed in Patent Literature 1 is characterized by being composed of a hardened body of a compound containing at least cement, pozzolanic fine powder, fine aggregate with a particle size of 2 mm or less, water, and a water-reducing agent.

Patent Literature 1 describes that the hardened body composed of this compound exhibits compressive strength exceeding 200 MPa and bending strength exceeding 20 MPa, so that the slat unit for the livestock barn composed of the hardened body of the compound according to Patent Literature 1 is less susceptible to chipping during storage, transportation, and construction, and can also reduce weight by reducing its thickness.

CITATION LIST

Patent Literature

[PTL 1] JP 2001-320995A

SUMMARY

Technical Problem

A conventional concrete slat unit is as heavy as 50 to 100 kg per unit, and thus has required a laborious laying operation. As compared to such conventional products, the slat unit for a livestock barn disclosed in Patent Literature 1 is considered to be able to reduce weight because the ultra-high strength concrete hardened body makes the slat unit less susceptible to chipping during storage, transportation and construction and thus ensures the strength of the slat unit without increasing its thickness.

However, as long as being made of concrete, this slat unit for the livestock barn, despite being less heavy than the other conventional products, is still considered to require enormous efforts in the laying operation.

In addition, in a case where the concrete slat units are laid out at an excretion area in a livestock barn, excrement on these slat units is less likely to fall down smoothly. If the excrement does not fall down smoothly and remains stuck and dry on a slat surface or in a slat opening, it is extremely difficult to remove the excrement by a cleaning work, thereby leading to deterioration of a livestock-raising environment.

In view of the above-described issues, the inventor of the present application has made a great deal of earnest consideration in order to provide a hygienic, high-durable slat unit for a livestock barn that significantly reduces efforts in a laying operation, and has eventually arrived at the present invention.

Solution to Problem

Specifically, a slat unit for a livestock barn according to the present invention is made of stainless steel that is a preferable floor material at an excretion area in a livestock barn. The slat unit is characterized by at least including a plurality of elongated slat panels, and one or more horizontal members that connect the plurality of slat panels arranged side by side in a crosswise direction and in parallel in a longitudinal direction of each slat panel. Both longitudinal sides of each of the slat panels are mountain-folded to form side wall portions. An angle between a planar portion of each of the slat panels and the respective side wall portions is smaller than 90°.

In addition, the slat unit for the livestock barn according to the present invention is characterized in that at least one of the side wall portions is further mountain-folded and thereafter valley-folded to form a reinforcing foot portion.

In addition, the slat unit for the livestock barn according to the present invention is characterized in that a reinforcing foot portion is provided in a protruding manner on a rear surface side of the planar portion of each of the slat panels, the reinforcing foot portion extending in the longitudinal direction of each of the slat panels.

Furthermore, the slat unit for the livestock barn according to the present invention in characterized by further including a protection cover arranged to cover an extreme end of the reinforcing foot portion.

In addition, the slat unit for the livestock barn according to the present invention is characterized in that each of the slat panels includes a plurality of protrusions and/or a plurality of through-holes at the planar portion and the side wall portions.

Furthermore, the slat unit for the livestock barn according to the present invention is characterized in that each of the one or more horizontal members includes a notch in a part exposed between adjacent ones of the slat panels in plan view.

Advantageous Effects of Invention

The slat unit for the livestock barn according to the present invention is composed of the stainless steel slat panels connected to each other. As compared to the conventional concrete slat units, the slat unit for the livestock barn according to the present invention can be significantly lighter in weight and can significantly reduce efforts in a laying operation. Besides, the slat unit for the livestock barn according to the present invention is hygienic and highly durable.

In addition, regarding the slat panels of the slat unit for the livestock barn according to the present invention, both longitudinal sides of each slat panel are mountain-folded to form the side wall portions, and the angle between the planar portion of the slat panel and the respective side wall portions is smaller than 90°. This arrangement prevents adhesion of excrement to the side wall portions when the excrement falls down through an opening between adjacent slat panels, and thus prevents the excrement from getting stuck to or accumulating in the opening between the adjacent slat panels, thereby enabling smooth fall of the excrement. Furthermore, the side wall portions that are formed continuously from the planar portion of the slat panel can easily prevent adhesion of the excrement to the rear surface side of the slat panel.

In addition, regarding the slat panels of the slat unit for the livestock barn according to the present invention, at least one of the side wall portions is mountain-folded and thereafter valley-folded to form the reinforcing foot portion. This arrangement can secure necessary strength of the slat panel without increasing its thickness, can minimize the thickness of the slat panel, and can reduce weight of the slat panel itself and thus weight of the slat unit for the livestock barn according to the present invention.

Alternatively, regarding the slat panels of the slat unit for the livestock barn according to the present invention, the reinforcing leg portion is provided in a protruding manner on the rear surface side of the planar portion of each of the slat panels, the reinforcing foot portion extending in the longitudinal direction of each of the slat panels. This arrangement can also secure necessary strength of the slat panel without increasing its thickness, and can also reduce weight of the slat panel itself and thus weight of the slat unit for the livestock barn according to the present invention.

In addition, regarding the slat panels of the slat unit for the livestock barn according to the present invention, the protection cover arranged to cover the extreme end of the reinforcing leg portion can protect the extreme end of the reinforcing leg portion, and can also easily prevent the extreme end of the reinforcing foot portion from damaging a floor surface and the like at an installation site during installation of the slat unit for the livestock barn according to the present invention.

Furthermore, regarding the slat unit for the livestock barn according to the present invention, each slat panel includes the plurality of protrusions formed on the planar portion and the side wall portions. These protrusions provide an anti-slip effect. Additionally or alternatively, each slat panel includes the plurality of through-holes formed on the planar portion and the side wall portions. These through-holes not only exhibit an anti-slip effect, but also allow the excrement dropped on the planar portion to fall down more smoothly through the through-holes and thus can keep a more hygienic condition on the planar portion.

Furthermore, the horizontal member of the slat unit for the livestock barn according to the present invention includes the notch in a part exposed between the slat panels that are adjacent in plan view. This arrangement can minimize the width of the horizontal member, at least at the exposed part between the adjacent slat panels, thereby allowing the excrement to fall down more smoothly.

DESCRIPTION OF EMBODIMENTS

Figure 1:
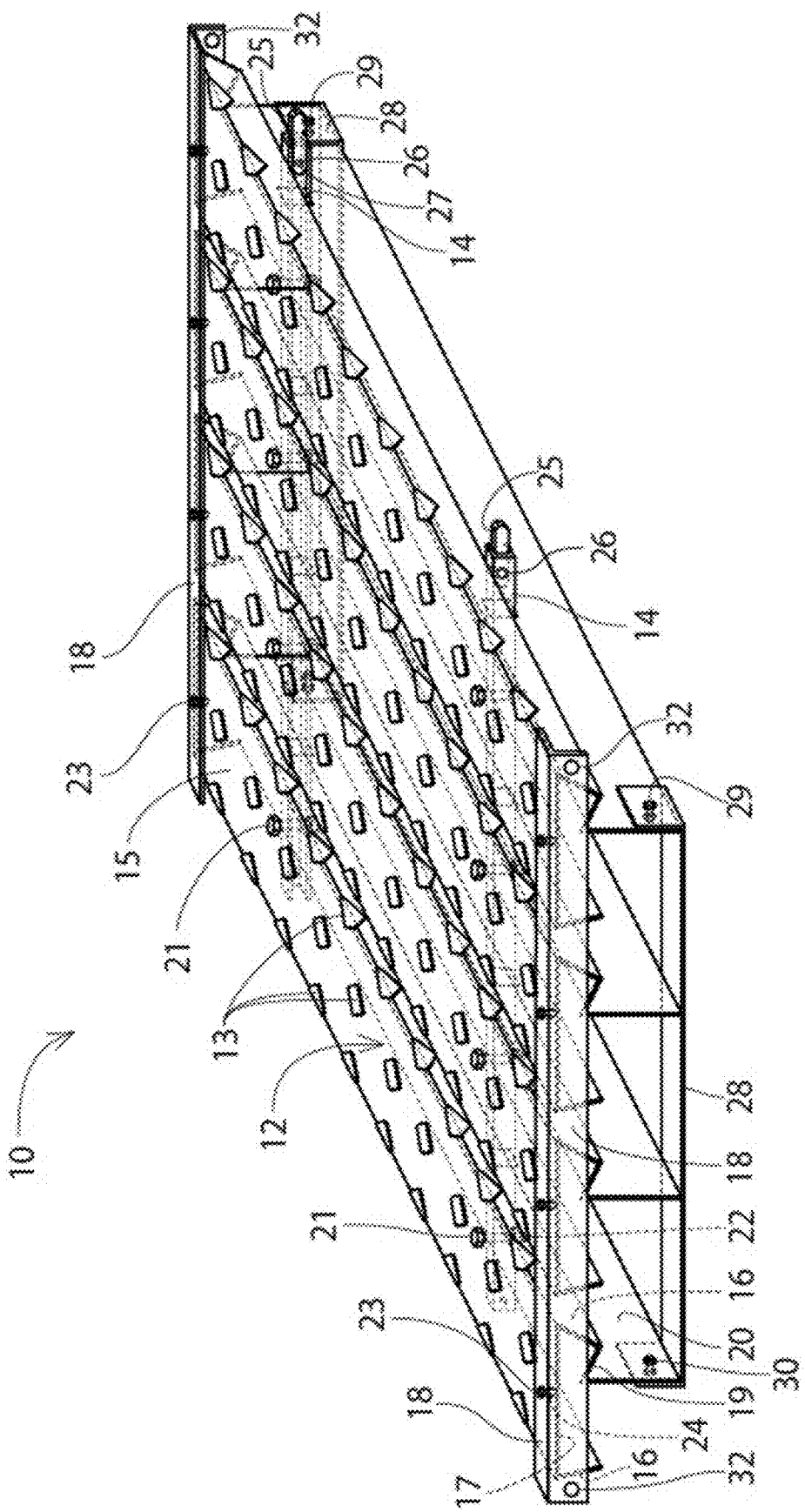
FIG. 1 is a perspective view of a slat unit for a livestock barn according to an embodiment of the present invention.
Figure 2:
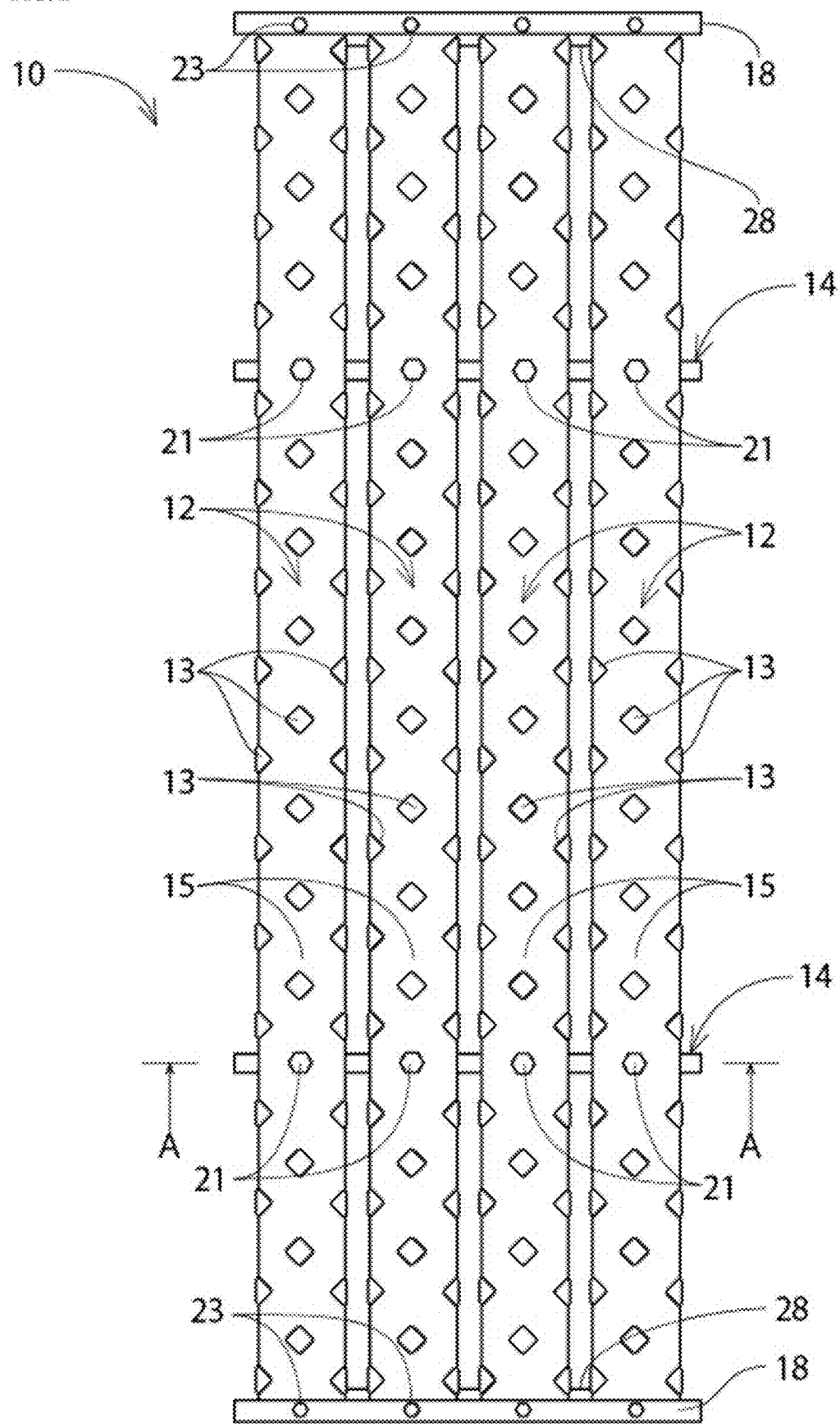
FIG. 2 is a plan view of the slat unit for the livestock barn illustrated in FIG. 1.
Figure 3:
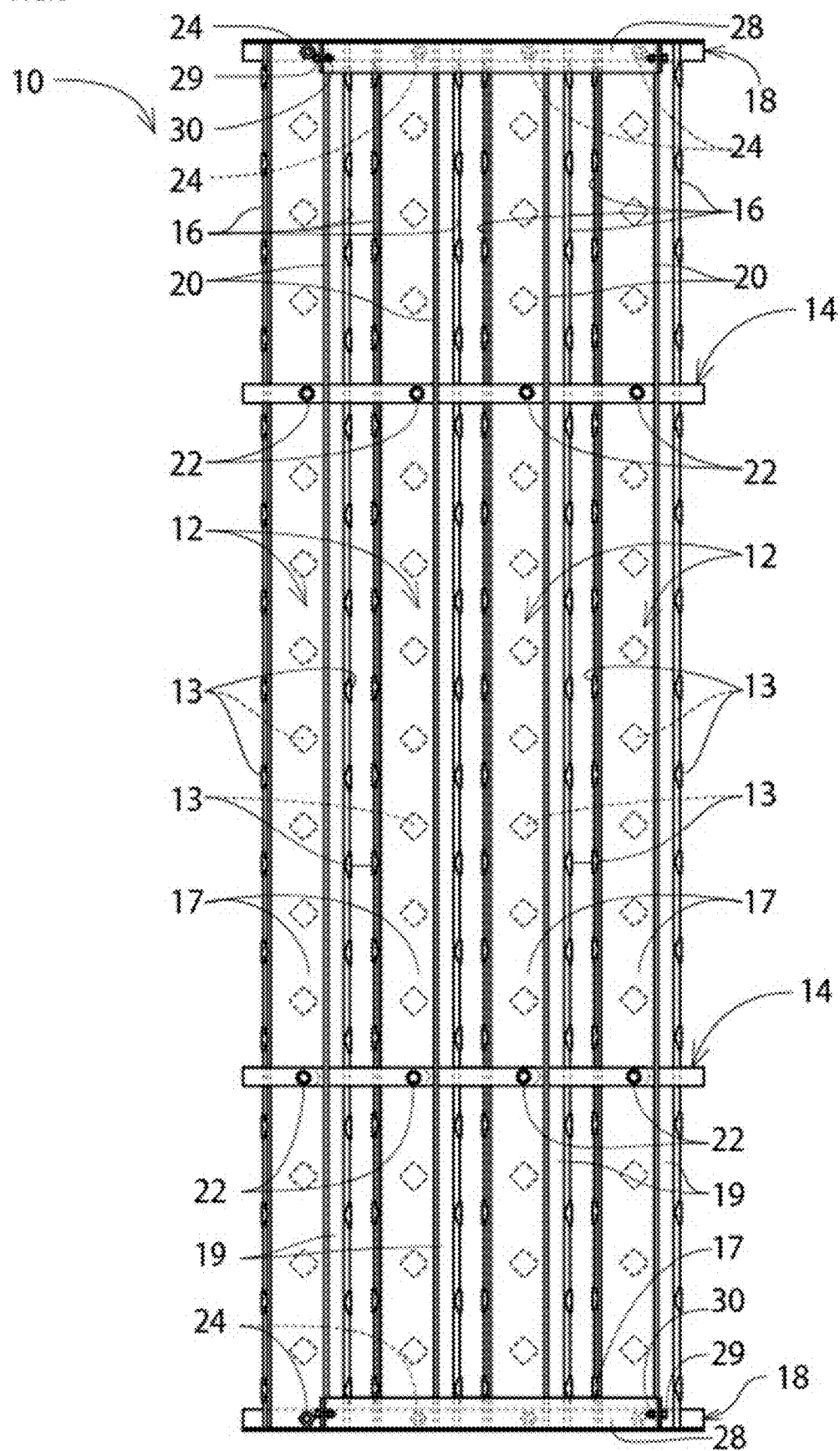
FIG. 3 is a bottom view of the slat unit for the livestock barn illustrated in FIG. 1.
Figure 4:
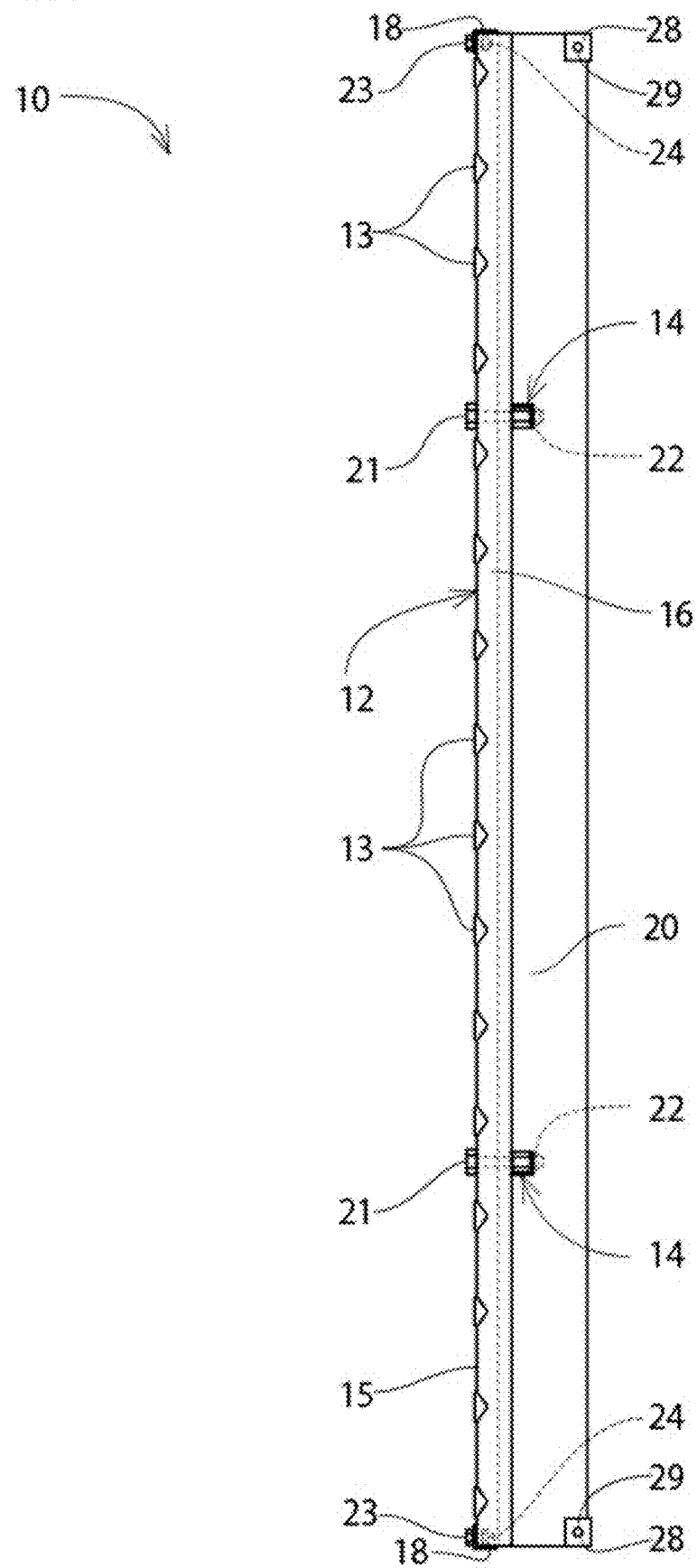
FIG. 4 is a right side view of the slat unit for the livestock barn illustrated in FIG. 1.
Figure 5:
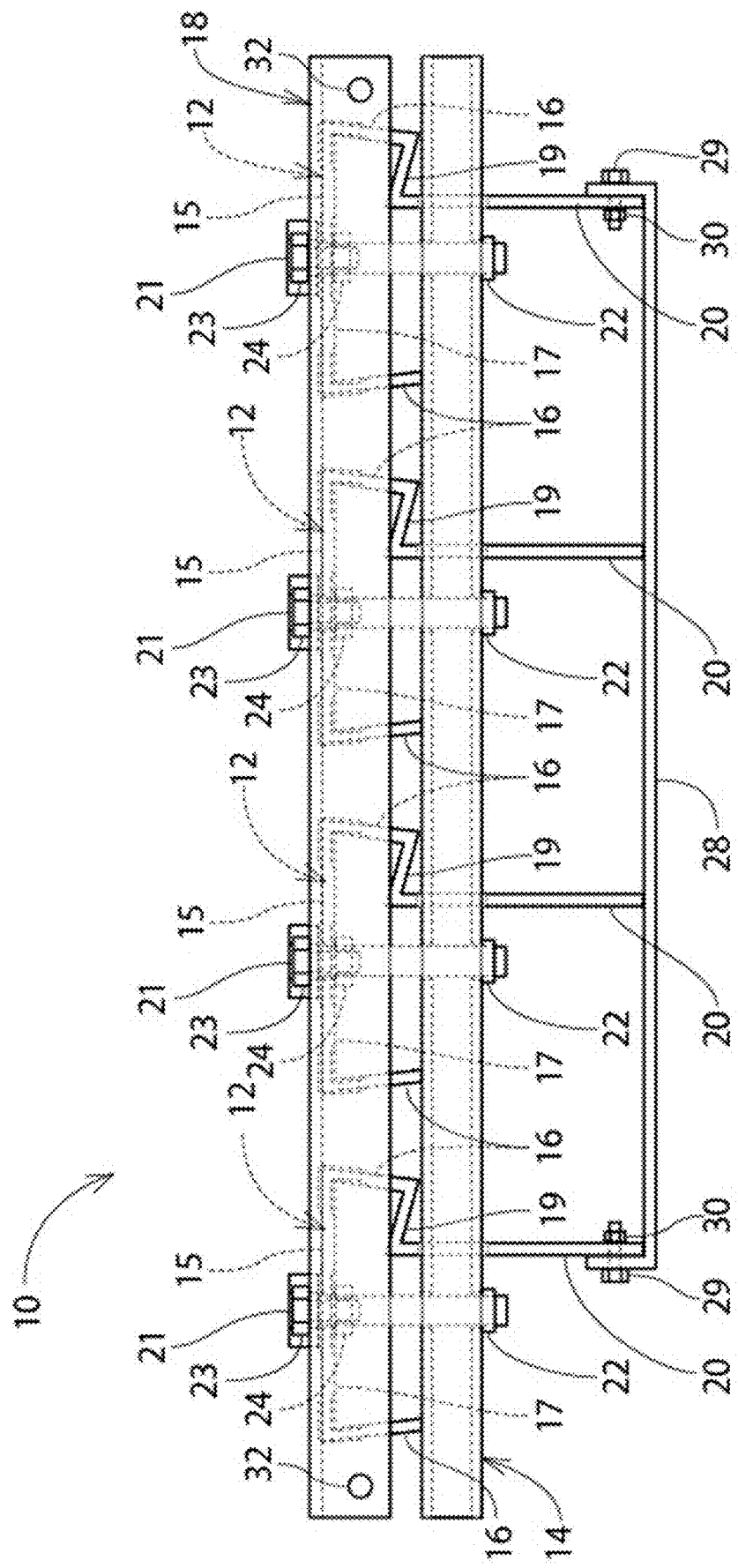
FIG. 5 is a front view of the slat unit for the livestock barn illustrated in FIG. 1.
Figure 6:
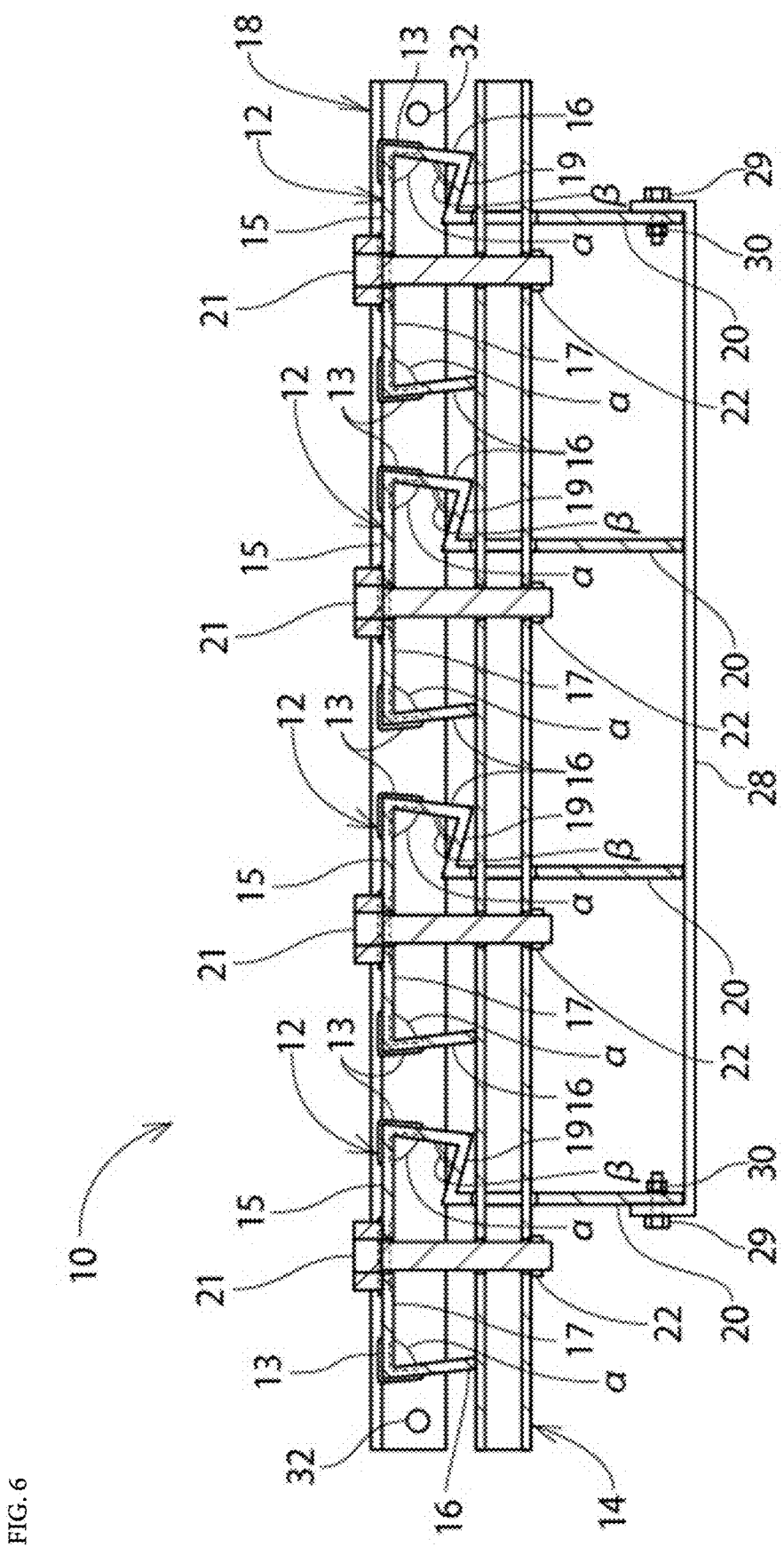
FIG. 6 is a sectional view taken along a line A-A in FIG. 2.

A slat unit for a livestock barn according to embodiments of the present invention will be described in detail below with reference to the accompanying drawings. FIG. 1 is a perspective view of a slat unit 10 for a livestock barn in an embodiment of the present invention. FIG. 2 is a plan view of the slat unit 10 for the livestock barn in the present embodiment illustrated in FIG. 1. FIG. 3 is a bottom view of the slat unit 10 for the livestock barn. FIG. 4 is a right side view of the slat unit 10 for the livestock barn. FIG. 5 is a front view of the slat unit 10 for the livestock barn. FIG. 6 is a sectional view of the slat unit 10 for the livestock barn. As illustrated in these drawings, the slat unit 10 for the livestock barn in the present embodiment is made of stainless steel that is a preferable floor material at an excretion area in a livestock barn, and at least includes a plurality of elongated slat panels 12 and one or more horizontal members 14 for connecting the plurality of slat panels 12 that are arranged side by side in a crosswise direction.

In the slat unit 10 for the livestock barn in the present embodiment, the slat panels 12 and the horizontal members 14 are made of stainless steel. Owing to the slat panels 12 and the horizontal members 14 made of stainless steel, the slat unit 10 is significantly lighter in weight as compared to conventional concrete slat units and can significantly reduce efforts in a laying operation.

In addition, especially when the slat unit 10 for the livestock barn in the present embodiment is used as the floor material at the excretion area in the livestock barn, the slat panels 12 and the horizontal members 14 made of stainless steel prevent excrement from getting stuck to surfaces of the slat panels 12 and the horizontal members 14 and thus facilitate a cleaning work, thereby easily keeping a hygienic livestock-raising environment.

In the slat unit 10 for the livestock barn in the present embodiment, each slat panel 12 is characterized in that both longitudinal sides of the slat panel 12 are mountain-folded to form side wall portions 16, and that an angle α between a planar portion 15 of the slat panel 12 and the respective side wall portions 16 is smaller than 90° (see FIG. 6).

By forming the side wall portions 16 with both longitudinal sides of the slat panel 12 being mountain-folded, and also by setting the angle α between the planar portion 15 of the slat panel 12 and the respective side wall portions 16 to be smaller than 90°, it is possible to reduce the possibility of excrement adhering to the side wall portions 16 when the excrement falls down through an opening between adjacent slat panels 12, thus to prevent the excrement from getting stuck to or accumulating in the opening between the adjacent slat panels 12, and thereby to allow the excrement to fall down smoothly.

In addition, the side wall portions 16 that are formed continuously from the planar portion 15 of the slat panel 12 can easily prevent adhesion of the excrement to a rear surface 17 side of the slat panel 12.

In the slat panel 12 of the slat unit 10 for the livestock barn in the present embodiment, one of the side wall portions 16 is further mountain-folded and thereafter valley-folded along its longitudinal direction to form a reinforcing foot portion 20.

The reinforcing foot portion 20, formed by further mountain-folding and thereafter valley-folding at least one of the side wall portions 16 along its longitudinal direction, can easily increase the strength of the slat panel 12. A typical slat panel has a flat plate shape and requires a greater thickness for a greater strength regardless of its material. A greater thickness increases the weight of the slat panel itself, and requires greater efforts in the laying operation.

On the other hand, regarding the slat panel 12 in the present embodiment, at least one of the side wall portions 16 is further mountain-folded along its longitudinal direction to form a folded portion 19, and thereafter valley-folded to form the reinforcing foot portion 20, so that the slat panel 12 can secure necessary strength without increasing its thickness. Consequently, it is possible to minimize the thickness of the slat panel 12, thereby reducing weight of the slat panel 12 itself and thus weight of the slat unit 10 for the livestock barn in the present embodiment.

Regarding the slat panel 12 in the present embodiment, as described above, one of the side wall portions 16 is further mountain-folded along its longitudinal direction to form the folded portion 19, and thereafter valley-folded to form the reinforcing foot portion 20. In forming the folded portion 19, it is especially preferable to set an angle β between the side wall portion 16 and the folded portion 19 to be equal to or smaller than 90°. Since the side wall portion 16 is further mountain-folded along its longitudinal direction to form the folded portion 19, at the angle β between the side wall portion 16 and the folded portion 19 that is set equal to or smaller than 90°, the folded portion 19 extends somewhat obliquely upward with respect to a horizontal direction. Consequently, while excrement is sliding down along the surface of the side wall portion 16, this configuration allows the excrement to fall down from a lower end edge of the side wall portion 16, and can easily prevent the excrement from sliding along the folded portion 19 and adhering to the reinforcing foot portion 20.

Further, the aspect of the slat panel of the slat unit for the livestock barn according to the present invention is not limited to the embodiment described above. For example, like a slat panel 12a illustrated in FIG. 9A, both of the side wall portions 16 may be further mountain-folded along the respective longitudinal directions to form folded portions 19 and thereafter valley-folded to form reinforcing foot portions 20. Also in this slat panel 12a, the angle β between the side wall portions 16 and the folded portions 19 is set to be equal to or smaller than 90° so as to allow the folded portions 19 to extend somewhat obliquely upward with respect to the horizontal direction. Consequently, while excrement is sliding down along the surface of the side wall portions 16, this alternative configuration can also allow the excrement to fall down from the lower end edges of the side wall portions 16, and can easily prevent the excrement from sliding along the folded portions 19 and adhering to the reinforcing foot portions 20.

Still further, in the slat panel of the slat unit for the livestock barn according to the present invention, it is not essential to form the reinforcing foot portion continuously with the side wall portion. For example, as shown by a slat panel 12b in FIG. 9B, both longitudinal sides of the planar portion 15 may be mountain-folded to form the side wall portions 16, and a reinforcing foot portion 20a having an inverted U-shape in front view may be arranged on the rear surface 17 side of the planar portion 15 such that the reinforcing foot portion 20a extends in the longitudinal direction of the slat panel 12b (the longitudinal direction of the planar portion 15).

Figure 9A:
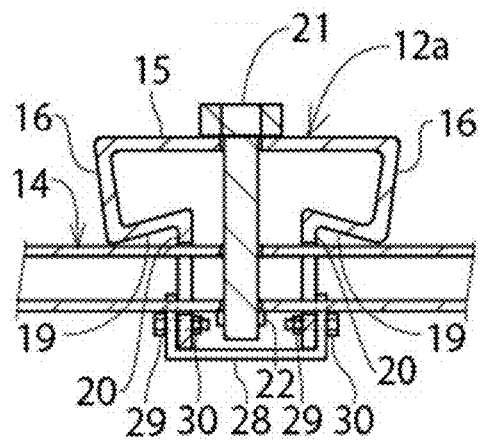
FIGS. 9A-9E are sectional views each illustrating a slat unit for a livestock barn according to another embodiment of the present invention.
Figure 9B:
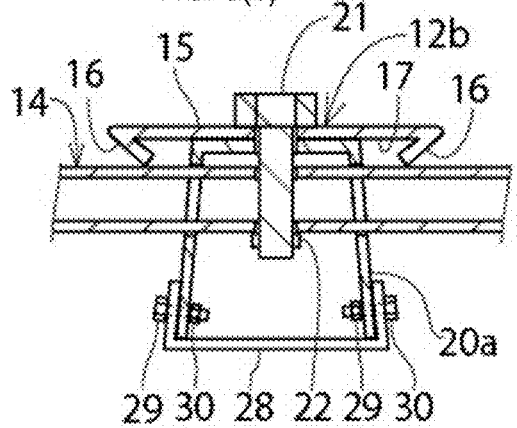
Figure 9C:
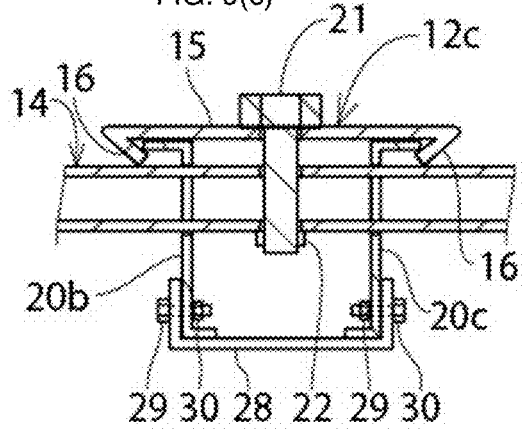

In a further aspect shown by a slat panel 12c in FIG. 9C, the planar portion 15 may have the side wall portions 16 similar to those of the slat panel 12b, and a reinforcing foot portion 20b having a Z-shape in front view and/or a reinforcing foot portion 20c having an S-shape in front view may be arranged on the rear surface 17 side of the planar portion 15 such that the reinforcing foot portion 20b and/or the reinforcing foot portion 20c extend(s) in the longitudinal direction of the slat panel 12c (the longitudinal direction of the planar portion 15).

Figure 9D:
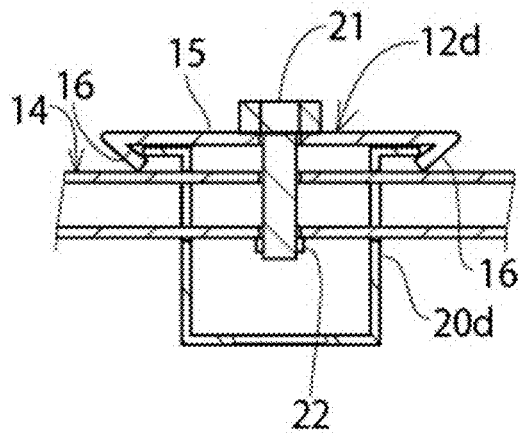
Figure 9E:
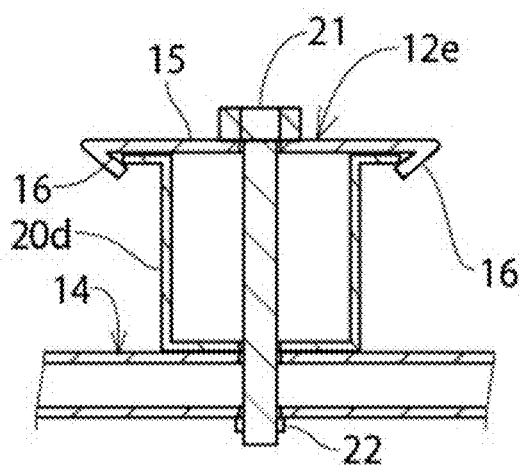

In each of additional aspects shown by slat panels 12d and 12e in FIGS. 9D and 9E, respectively, the planar portion 15 may have the side wall portions 16 similar to those of the slat panels 12b and 12c, and a reinforcing foot portion 20d having a U-shape in front view may be arranged on the rear surface 17 side of the planar portion 15 such that the reinforcing foot portion 20d extends in the longitudinal direction of the slat panels 12d and 12e (the longitudinal direction of the planar portion 15).

Like the slat panels 12a to 12e according to the embodiments illustrated in FIGS. 9A to 9E, the reinforcing foot portion may be formed continuously from the side wall portions 16 (for example, the reinforcing foot portions 20) or may be arranged separately from the side wall portions 16 (for example, the reinforcing foot portions 20a to 20d). Any of these aspects can secure necessary strength without increasing the thickness of the planar portion 15 and that of the side wall portions 16, and can reduce weight of the slat panel 12 itself. Although the slat panels 12b to 12e are not provided with the folded portion 19, the reinforcing foot portions 20a to 20d, arranged on an inner side than the lower end edges of the side wall portions 16, can allow excrement to fall down from the lower end edges of the side wall portions 16 while the excrement is sliding along the surfaces of the side wall portions 16 and can easily prevent the excrement from adhering to the reinforcing foot portions 20a to 20d.

To provide the slat panel for the livestock barn according to the present invention, the slat panels 12, 12a, 12b, 12c, 12d, or 12e according to the above-described embodiments are arranged side by side in a crosswise direction and in parallel in a longitudinal direction of each slat panel, and are connected by at least one horizontal member. As illustrated in FIGS. 2 and 6, the slat unit 10 for the livestock barn in the present embodiment is composed of four slat panels 12 arranged side by side in the crosswise direction and connected by two horizontal members 14. The manner of connecting the slat panel 12 and the horizontal member 14 is not specifically limited. For example, each slat panel 12 may be easily connected and fixed to the horizontal member 14 with a bolt 21 and a nut 22. Instead, each slat panel 12 may be fixed to the horizontal member 14 by welding. However, removable fixing with use of the bolt 21 and the nut 22 enables replacement of only a damaged slat panel 12.

While the slat unit 10 for the livestock barn in this embodiment is composed of the four slat panels 12 and the two horizontal members 14, the required number of slat panels and that of horizontal members to compose the slat unit for the livestock barn according to the present invention are not specifically limited. For example, the number of slat panels 12 may be three or less, or five or more, depending on a desired size of the slat unit for the livestock barn. The slat panels 12 having a short length may require only one horizontal member 14, whereas the slat panels 12 having a long length may require three or more horizontal members 14.

In the slat unit 10 for the livestock barn in this embodiment, the horizontal member 14 is arranged in a transversely penetrating manner through the reinforcing foot portion 20 for each slat panel 12, and the slat panel 12 is fixed to the horizontal member 14 with the bolt 21 inserted from above the planar portion 15 and the nut 22. Also regarding the slat panels 12a to 12d in the embodiments illustrated in FIGS. 9A to 9D, the horizontal member 14 is arranged in a transversely penetrating manner through each of the reinforcing foot portions 20 and 20a to 20d for the slat panels 12a to 12d, and each of the slat panels 12a to 12d is fixed to the horizontal member 14 with the bolt 21 inserted from above the planar portion 15 of the slat panels 12a to 12d and the nut 22. Note that the arrangement of the horizontal member 14 is not specifically limited, either. For example, the slat panel 12e in the embodiment illustrated in FIG. 9E is fixed to the horizontal member 14 with the bolt 21 and the nut 22, with the reinforcing foot portion 20d for the slat panel 12e being placed on the horizontal member 14.

Figure 10:
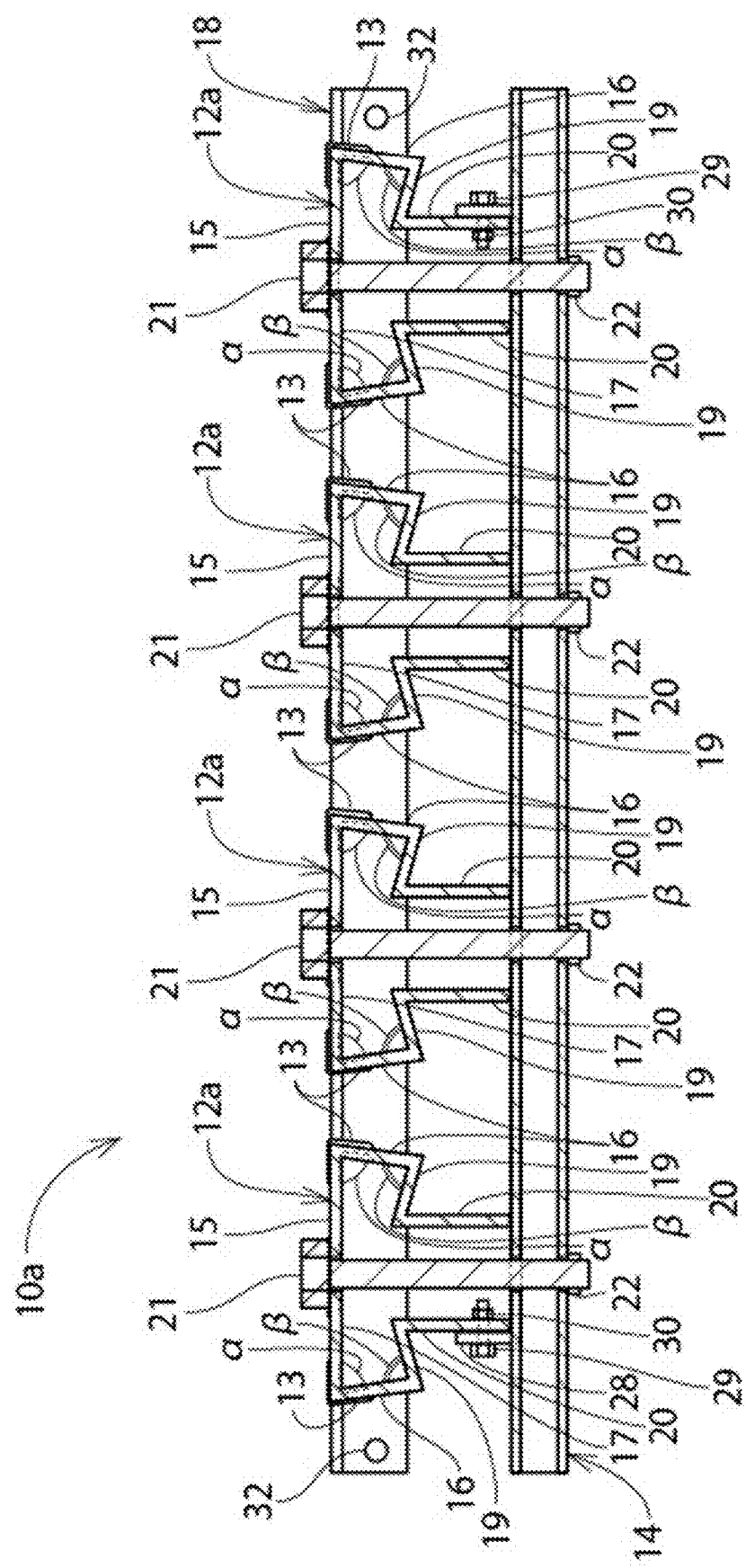
FIG. 10 is a sectional view illustrating a slat unit for a livestock barn according to another embodiment of the present invention.

Referring to FIG. 10, a slat unit 10a for a livestock barn according to the illustrated embodiment is composed of a plurality of mutually connected slat panels 12a, each of which is illustrated in FIG. 9A. The plurality of slat panels 12a is arranged side by side in the crosswise direction, with the reinforcing foot portions 20 standing on the horizontal member 14, and with each slat panel 12a being fixed to the horizontal member 14 with the bolt 21 and the nut 22.

Further, regarding each of the slat unit 10 for the livestock barn and the slat unit 10a for the livestock barn in the present embodiments, an end cover 18 that covers and extends across longitudinal ends of the slat panels 12, 12a is arranged at each longitudinal end of each slat unit 10, 10a. The end cover 18 is fixed to each of the slat panels 12, 12a with a bolt 23 and a nut 24. In each of the slat unit 10 for the livestock barn and the slat unit 10a for the livestock barn in the present embodiments, the end covers 18 arranged at both longitudinal ends of each slat unit 10, 10a can reinforce the ends of the slat panels 12, 12a and thus can easily avoid damage to the ends. The end covers 18 can also easily protect livestock animals and workers from injuries caused by the ends of the slat panels 12, 12a, and can easily prevent the excrement from adhering to the rear surface 17 side via the ends of the slat panels 12, 12a.

Preferably, each slat panel of the slat unit for the livestock barn according to the present invention includes a plurality of protrusions and/or a plurality of through-holes formed at the planar portion and the side wall portions of the slat panel. For example, regarding the slat unit 10 for the livestock barn in the present embodiment illustrated in FIG. 1, each slat panel 12 includes quadrangular protrusions 13 formed all over the planar portion 15 and the side wall portions 16. The protrusions 13 formed on the planar portion 15 provide an anti-slip effect on the surface of the planar portion 15 made of stainless steel. The protrusions 13 formed on the side wall portions 16 provide an anti-slip effect in an opening between the slat panels 12, 12.

The slat unit 10 for the livestock barn in the present embodiment is provided with only the plurality of protrusions 13 formed on the planar portion 15 and the side wall portions 16 of each slat panel 12. However, the plurality of through-holes may be formed instead of or in addition to the protrusions 13. The through-holes not only exhibit an anti-slip effect, but also allow excrement dropped on the planar portion 15 to fall down more smoothly through the through-holes and thus can keep a more hygienic condition on the planar portion 15.

Note that the shape and number of protrusions 13 or through-holes are not specifically limited, and may be freely set. When forming the through-holes, it is more preferable to have the outer edge of each through-hole curved downward. The downward curve along the outer edge of the through-hole can allow excrement to fall down smoothly from above the planar portion 15 through the through-hole, and can also easily prevent adhesion of the excrement to the rear surface 17 side of the planar portion 15.

Figure 7:
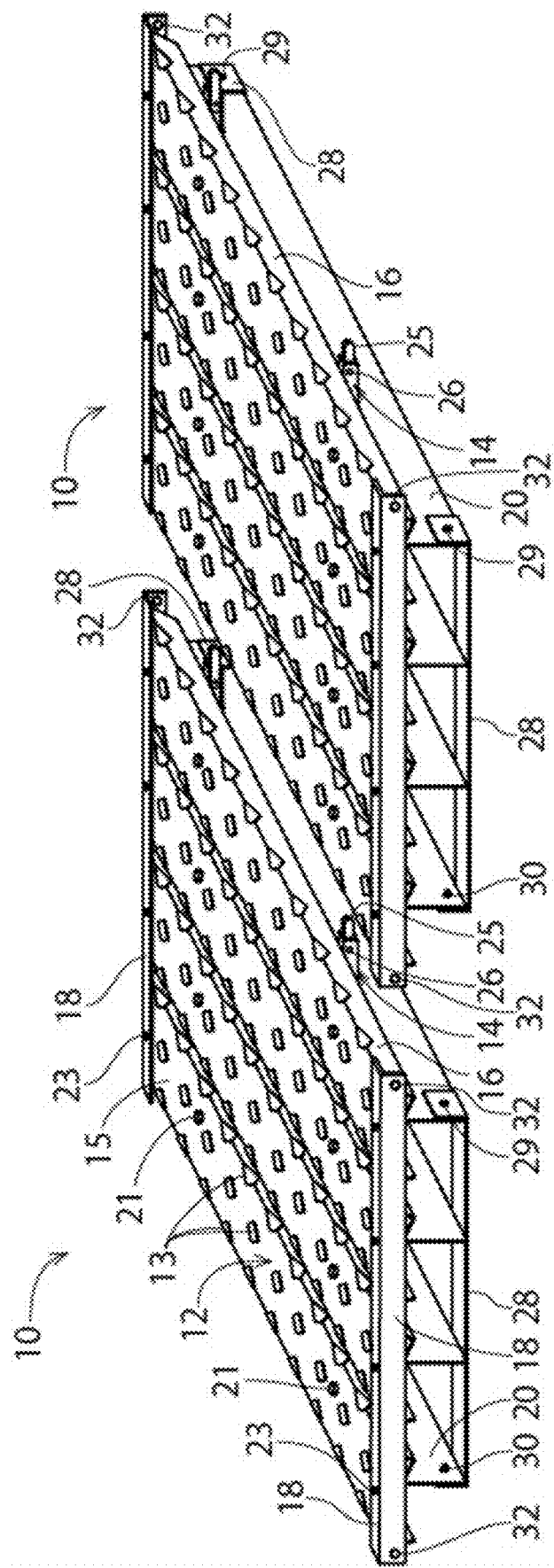
FIG. 7 is a perspective view illustrating a manner of crosswise connection of the slat units for the livestock barn illustrated in FIG. 1.
Figure 8A:
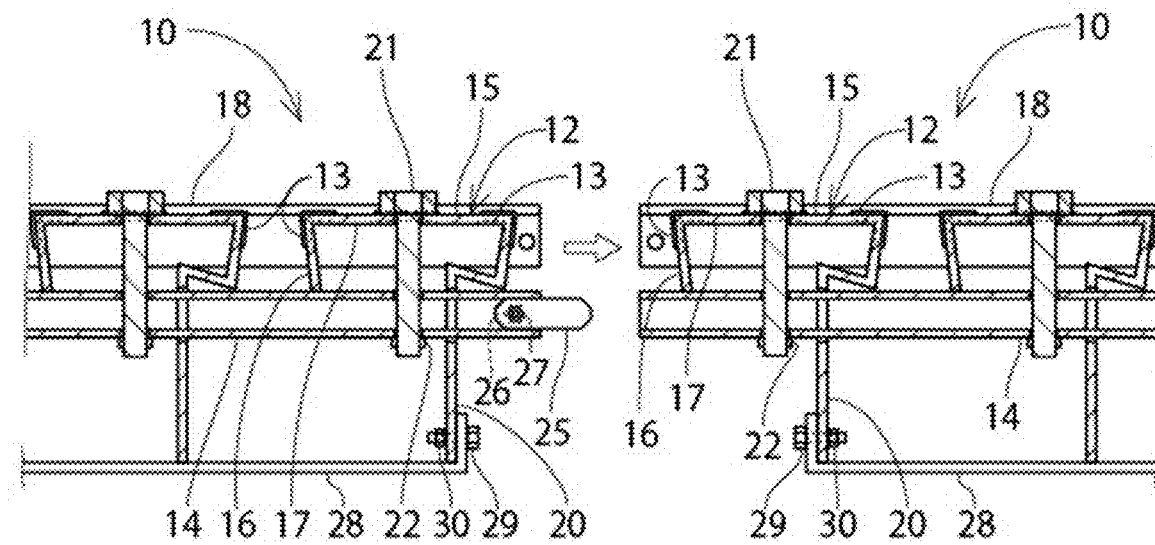
FIG. 8A is a sectional view illustrating a state before the connection according to the manner of connection illustrated in FIG. 7.
Figure 8B:
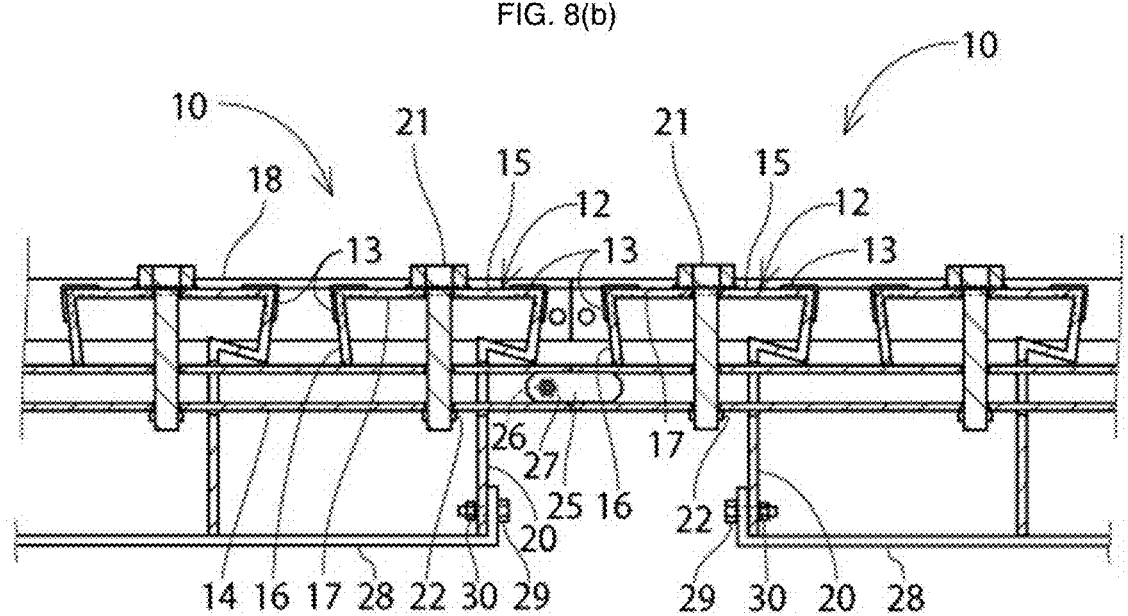
FIG. 8B is a sectional view illustrating a state after the connection.

So far, the detailed description has been given of the various embodiments of the slat unit for the livestock barn according to the present invention. Further on the slat unit for the livestock barn according to the present invention, a plurality of slat units for the livestock barn can be connected in use. For example, as illustrated in FIGS. 7 and 8A-8B with respect to the slat units 10 for the livestock barn in the present embodiment, it is possible to provide an integrated structure by arranging the slat units 10 for the livestock barn side by side in the crosswise direction and connecting adjacent horizontal members 14 with a connector 25. Integration of the plurality of slat units 10 for the livestock barn via the connector 25 not only increases load bearing of the slat units 10 for the livestock barn, but also prevents easy wobbling of the plurality of slat units 10 for the livestock barn that are laid out extensively, thereby ensuring a stable footing for livestock animals and workers walking on these slat units 10 for the livestock barn.

The manner of connecting the slat units 10 for the livestock barn in the present embodiment is not specifically limited. For example, a user can easily connect the adjacent slat units 10 for the livestock barn by fixing one end of the connector 25 to the horizontal member 14 of a first slat unit 10 with a bolt 26 and a nut 27, and inserting the other end of the connector 25 into the horizontal member 14 of an adjacent second slat unit 10 for the livestock barn. For more solid connection, the other end of the connector 25 inserted in the horizontal member 14 of the adjacent second slat unit 10 for the livestock barn may be also fixed to this horizontal member 14 with another bolt 26 and another nut 27.

Figure 12:
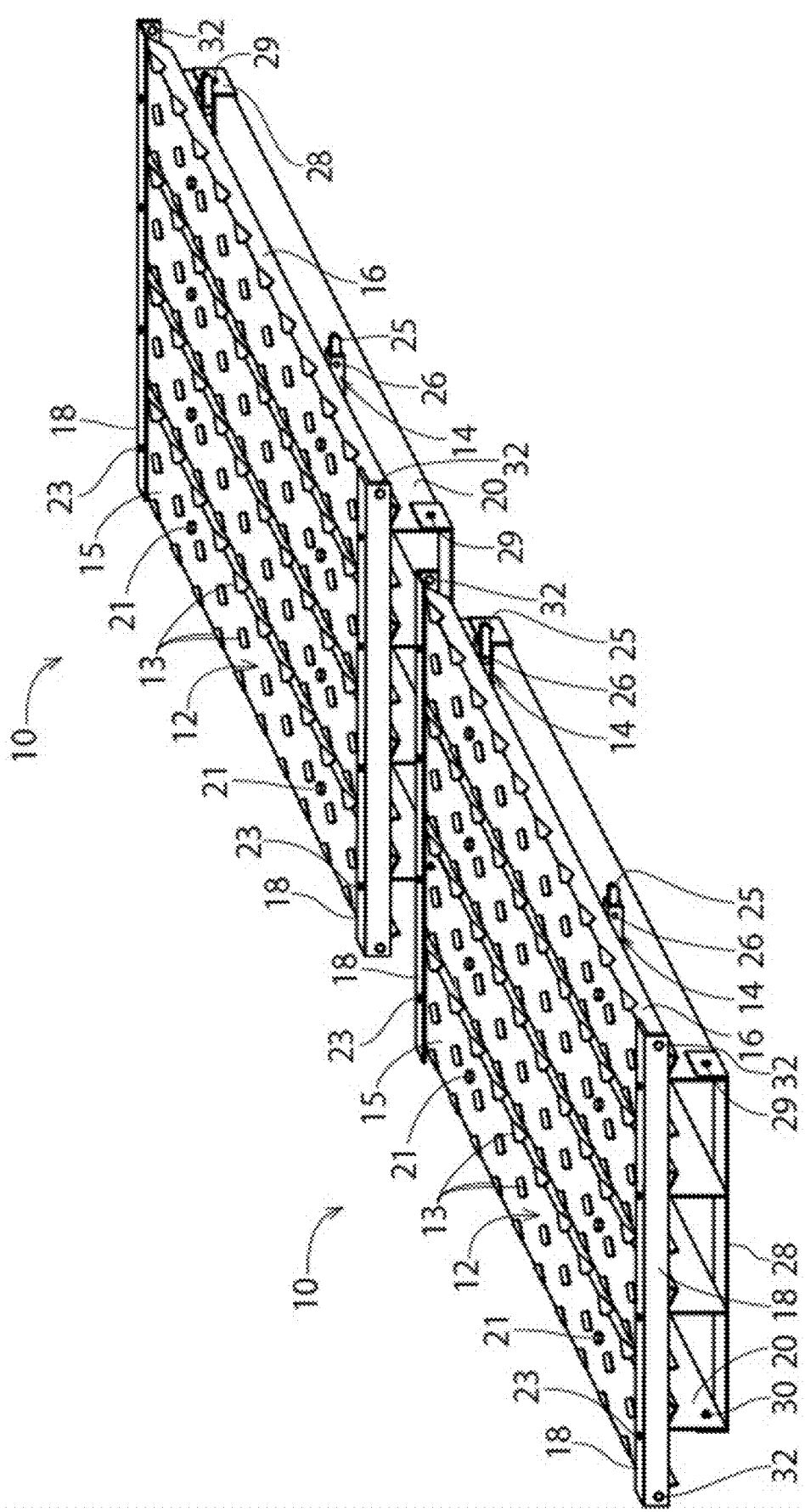
FIG. 12 is a perspective view illustrating a manner of lengthwise connection of the slat units for the livestock barn illustrated in FIG. 1.
Figure 13A:
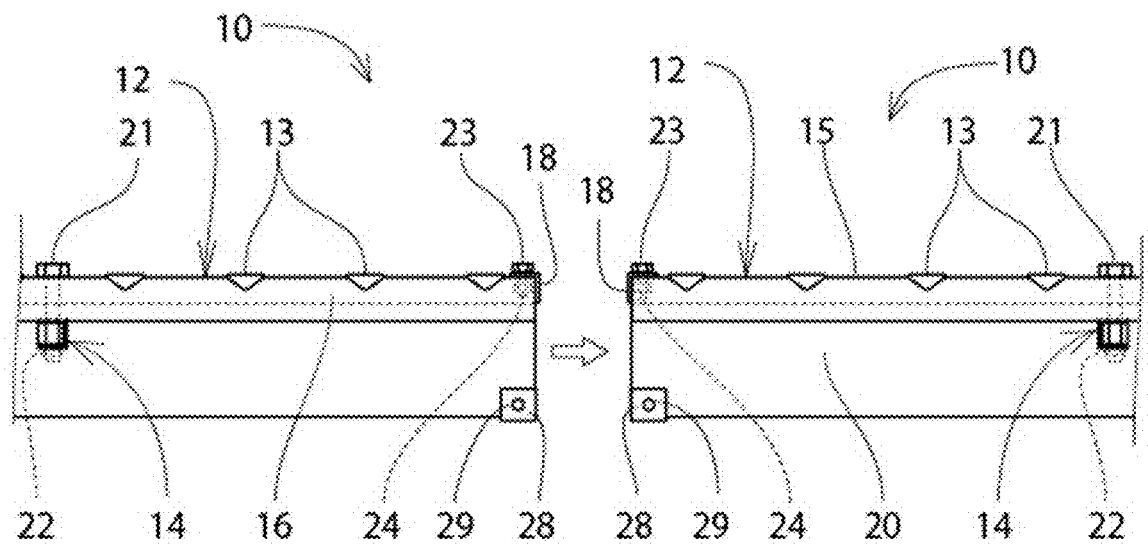
FIG. 13A is a sectional view illustrating a state before the connection according to the manner of connection illustrated in FIG. 12.
Figure 13B:
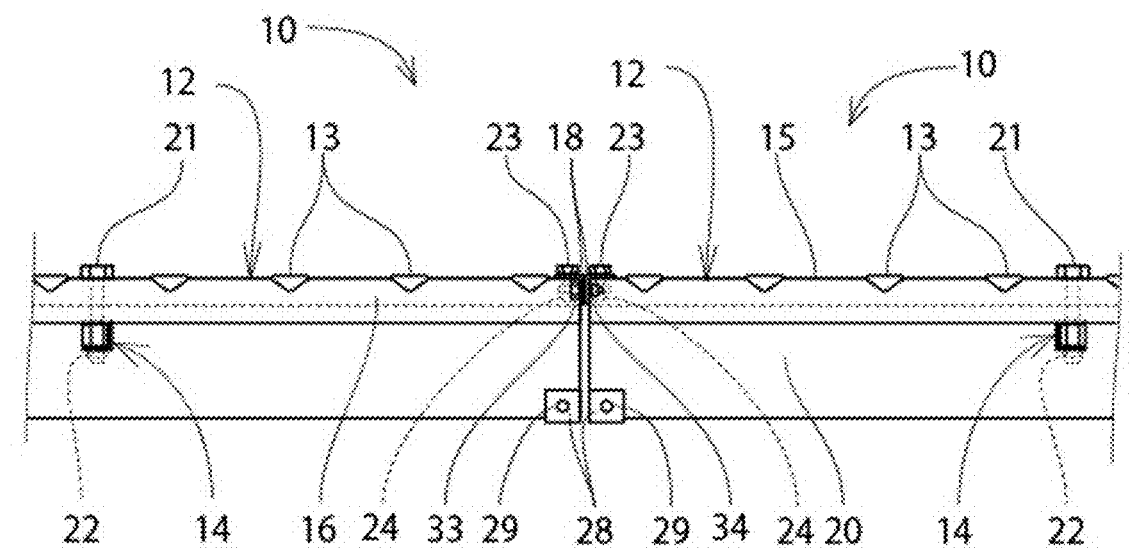
FIG. 13B is a sectional view illustrating a state after the connection.

In using the slat unit for the livestock barn according to the present invention, the plurality of slat units for the livestock barn can be also connected in a lengthwise direction (longitudinal direction). For example, as illustrated in FIGS. 12 and 13A-13B, a user can integrate the slat units 10 for the livestock barn in the present embodiment by arranging the slat units 10 for the livestock barn in the lengthwise direction (the longitudinal direction of the slat panel 12) and connecting their adjacent end covers 18. Lengthwise connection and integration of the plurality of slat units 10 for the livestock barn can achieve a similar effect to that described above. Combination of the crosswise connection and the lengthwise connection can achieve an effect of further increasing the load bearing and can provide a hygienic, extensive footing.

The manner of connecting the slat units 10 for the livestock barn in the lengthwise direction is not specifically limited, either. For example, with at least one connection hole 32 being formed in advance in each end cover 18, a user can easily connect the slat units 10 for the livestock barn, as illustrated in FIG. 13B, by bringing the end covers 18 of the adjacent slat units 10 for the livestock barn into contact with each other, inserting a bolt 33 into the connection holes 32 of the end covers 18, and fixing the bolt 33 with a nut 34.

Furthermore, it is more preferable that the slat panel of the slat unit for the livestock barn according to the present invention include a protection cover arranged to cover an extreme end of the reinforcing foot portion. For example, as illustrated in FIGS. 1, 3, 5, etc. with regard to the slat unit 10 for the livestock barn according to the embodiment of the present invention that is composed of the plurality of connected slat panels 12 each having the reinforcing foot portion 20, protection covers 28 to cover extreme ends of the reinforcing foot portions 20 are arranged at both longitudinal ends of the reinforcing foot portions 20. The protection covers 28 arranged to cover the extreme ends of the reinforcing foot portions 20 can protect the extreme ends of the reinforcing foot portions 20 at both longitudinal ends of the reinforcing foot portions 20. In addition, during installation of the slat unit 10 for the livestock barn in the present embodiment, the protection covers 28 can easily prevent the extreme ends of the reinforcing foot portions from damaging a floor surface and the like at an installation site.

In the slat units 10, 10a for the livestock barn of the embodiments illustrated in FIGS. 1 to 8 and 10, composed of the plurality of connected slat panels 12 or the plurality of connected slat panels 12a, respectively, the extreme ends of the reinforcing foot portions 20 at each longitudinal end of the reinforcing foot portions 20 are collectively covered by one protection cover 28. However, as illustrated in FIGS. 9A to 9C by the slat panels 12a to 12c for composing the slat unit for the livestock barn according to the present invention, the protection cover 28 may be provided for each one of the slat panels 12a to 12c so as to cover the extreme ends of the reinforcing foot portions 20 of each one of the slat panels 12a to 12c.

Figure 11:
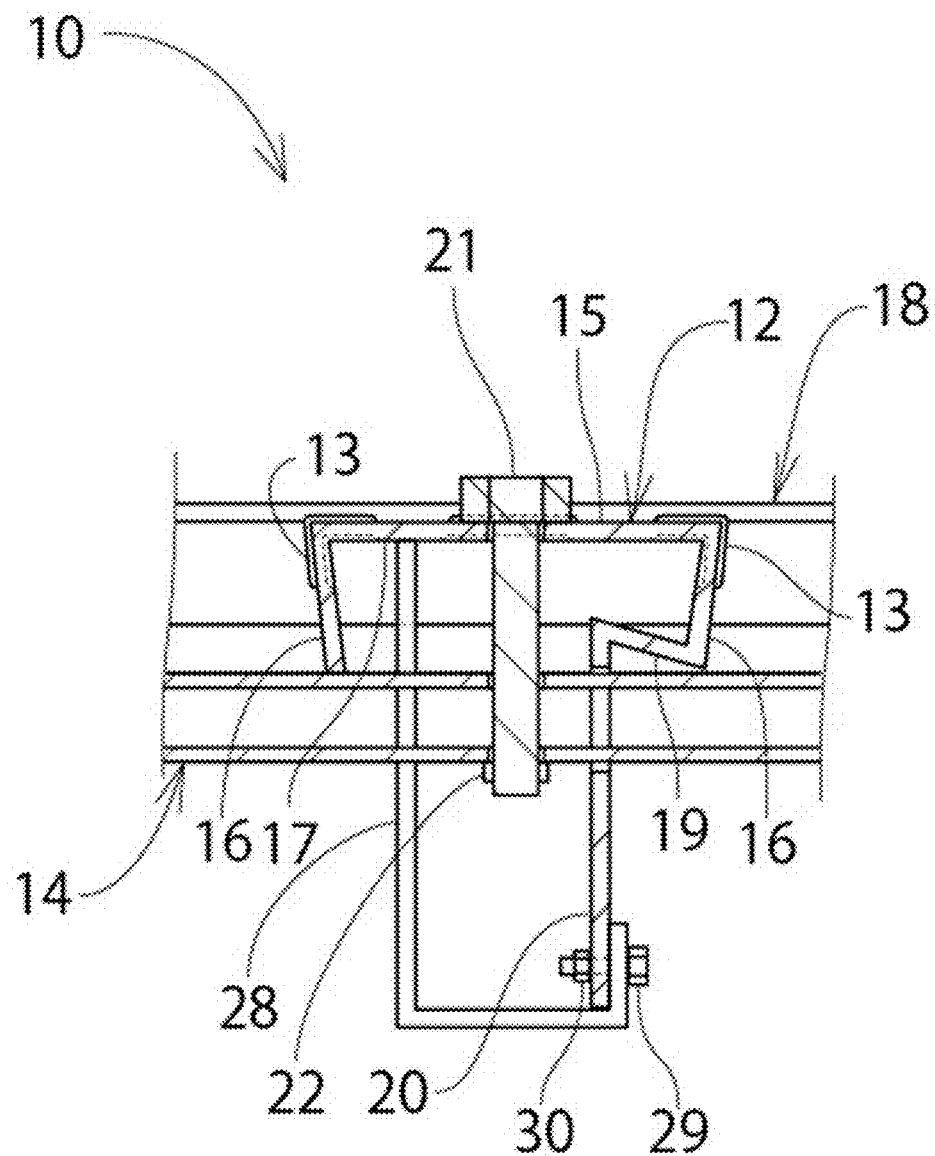
FIG. 11 is a partial sectional view illustrating the slat unit for the livestock barn according to another embodiment of the present invention.

Further referring to FIG. 11 for the plurality of slat panels 12 composing the slat unit 10 for the livestock barn according to one embodiment of the present invention, the protection cover 28 may be arranged one by one to cover the extreme end of the reinforcing foot portion 20 of each slat panel 12. Since the reinforcing foot portion 20 in the embodiment illustrated in FIG. 11 is formed on only one side of the slat panel 12, one end of the protection cover 28 covers the extreme end of the reinforcing foot portion 20 and is connected to the reinforcing foot portion 20, whereas the other end of the protection cover 28 is in contact with the rear surface 17 side of the slat panel 12.

While the manner of mounting the protection cover 28 to the reinforcing foot portion 20 is not specifically limited, it is simple to fix the reinforcing foot portion 20 and the protection cover 28 with a bolt 29 and a nut 30.

Figure 14:
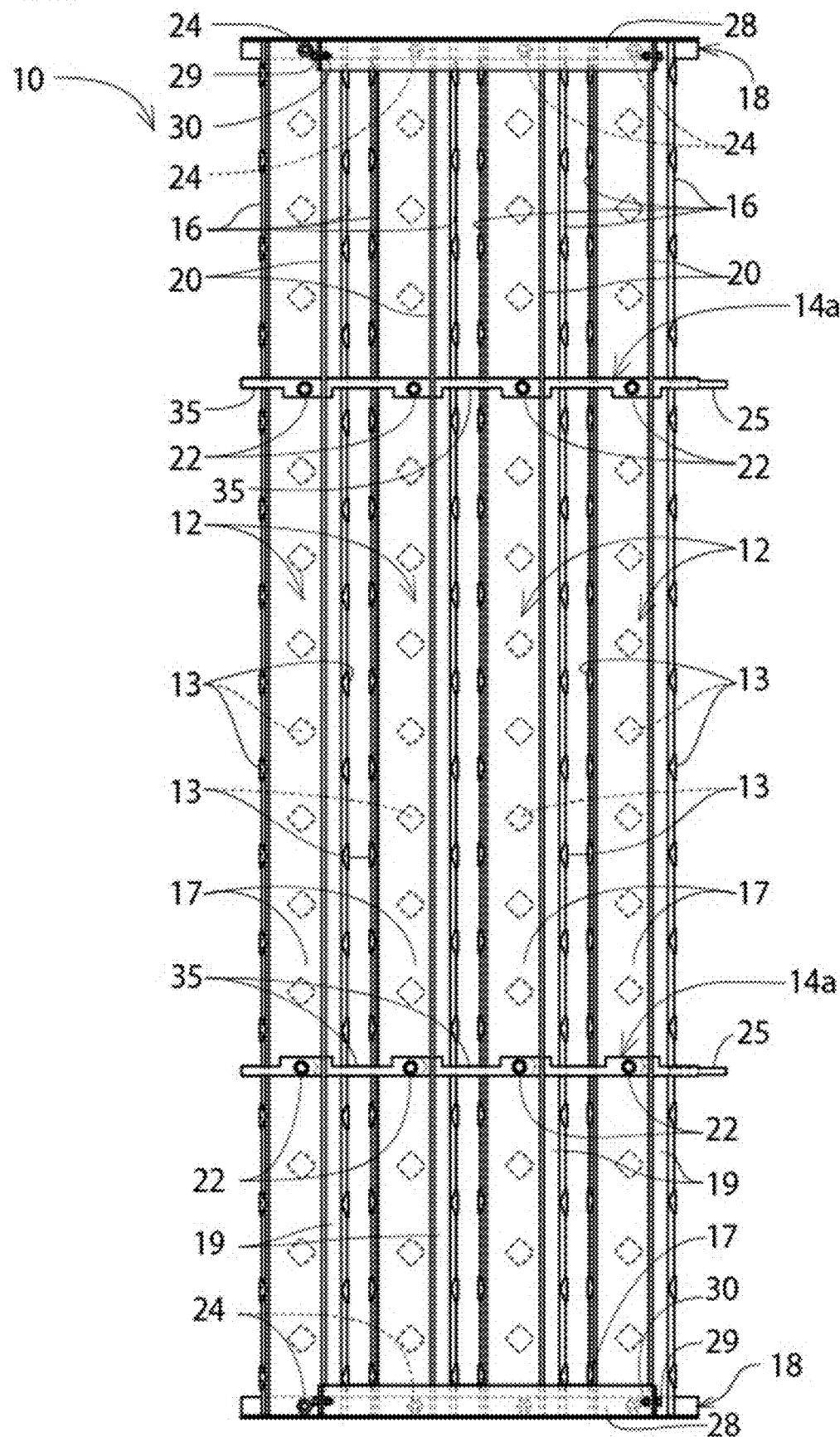
FIG. 14 is a bottom view of a slat unit for a livestock barn according to another embodiment of the present invention.

It should not be construed that the slat units for the livestock barn in the embodiments of the present invention exemplified above substantially limit the technical idea of the present invention. For example, with respect to the slat unit 10 for the livestock barn according to one embodiment of the present invention illustrated in FIG. 14, a horizontal member 14a is provided with notches 35 at least in some parts exposed between the adjacent slat panels 12, 12. Inclusion of the notches 35, like the horizontal member 14a in the present embodiment, can minimize the width of the horizontal member 14a exposed between the adjacent slat panels 12, 12, so that excrement falling between the adjacent slat panels 12, 12 can fall down more smoothly. Note that the positions of the notches 35 are not limited to a part between the adjacent slat panels 12, 12. Preferably, the notches 35 may also be formed at both ends of the horizontal member 14a. As illustrated in FIGS. 7 and 8A-8B, during and after the crosswise connection operation of the slat units 10 for the livestock barn, both ends of the horizontal member 14a are exposed between the slat units 10, 10 for the livestock barn that are adjacent in plan view. Thus, the notch 35 formed at both ends of the horizontal member 14a can allow the excrement falling between the adjacent slat units 10, 10 for the livestock barn to fall down more smoothly.

Figure 15A:
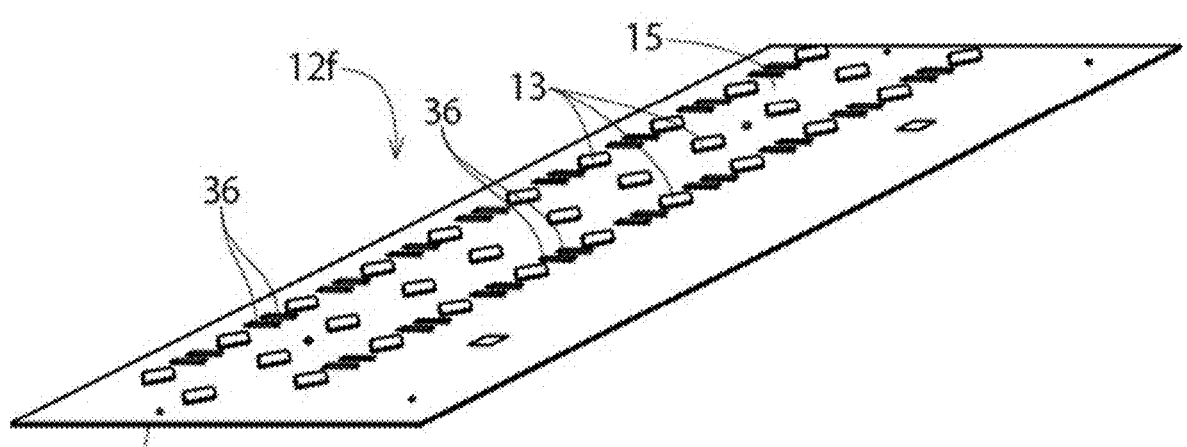
FIGS. 15A and 15B are perspective views of a slat panel according to another embodiment of the present invention, showing a state before folding and a state after folding, respectively.
Figure 15B:
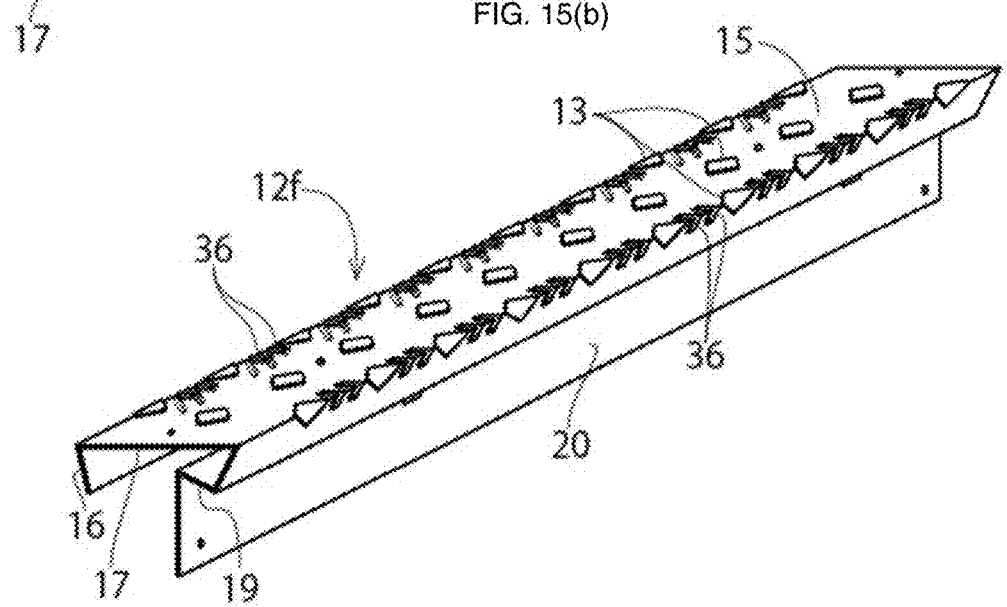
Figure 16:
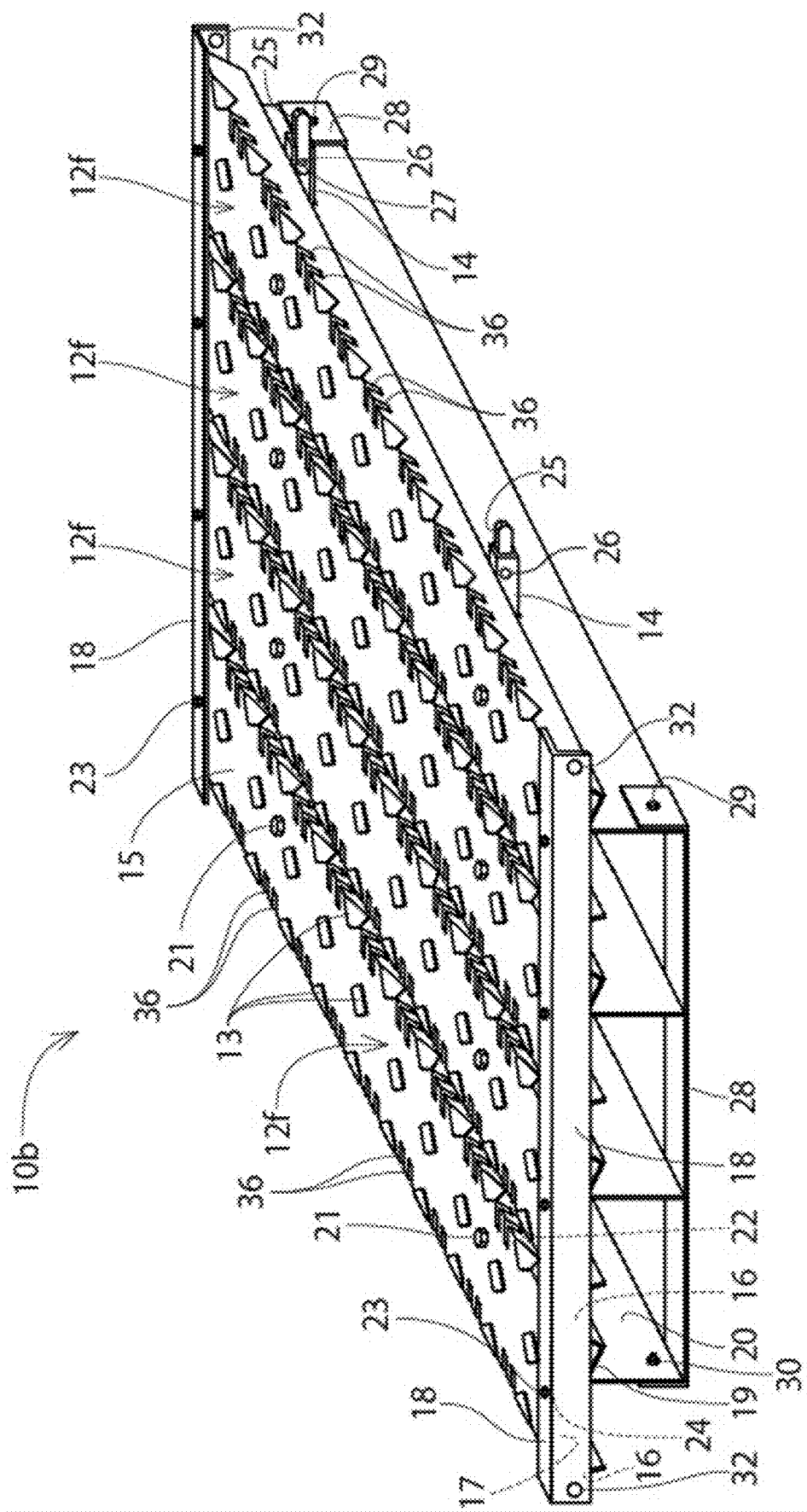
FIG. 16 is a perspective view of a slat unit for a livestock barn composed of the slat panels illustrated in FIGS. 15A and 15B, according to another embodiment of the present invention.

Furthermore, FIGS. 15A-15B and 16 each illustrate a slat panel 12f according to another embodiment of the present invention and a slat unit 10b for the livestock barn composed of the connected slat panels 12f. As illustrated in FIG. 15A by the slat panel 12f before being folded, it is preferable to form at least one linear recess 36 in a longitudinal direction along a mountain-fold position at which the slat panel 12f is mountain-folded to form each side wall portion 16, with the at least one linear recess 36 oriented at a right angle with respect to the longitudinal direction of the mountain-fold position. The at least one linear recess 36 formed in the longitudinal direction along each mountain-fold position significantly facilitates a folding process for forming the slat panel 12f illustrated in FIG. 15B, thereby reducing a load to a machine for the folding process. The manner of forming the at least one linear recess 36 is not specifically limited, and more than one linear recess 36 may be formed in each interval between adjacent protrusions 13, 13 as illustrated. In a case where there is no protrusion 13 at the mountain-fold position, the linear recesses 36 may be formed across the entire length in the longitudinal direction along the mountain-fold position. The present invention can be implemented by making appropriate improvements, modifications, or additions by ingenuity of a person skilled in the art without departing from the gist of the invention.

REFERENCE SIGNS LIST 10, 10a Slat unit for a livestock barn
12, 12a to 12f Slat panel
13 Protrusion
14, 14a Horizontal member
15 Planar portion
16 Side wall portion
17 Rear surface
18 End cover
19 Folded portion 20, 20a to 20d Reinforcing foot portion
21, 23, 26, 29, 33 Bolt
22, 24, 27, 30, 34 Nut
25 Connector
28 Protection cover
32 Connection hole
35 Notch
36 Linear recess

The invention claimed is:

1. A slat unit for a livestock barn made of stainless steel that is a preferable floor material at an excretion area in a livestock barn, comprising at least:
   a plurality of elongated slat panels; and
   one or more horizontal members that connect the plurality of slat panels arranged side by side in a crosswise direction and in parallel in a longitudinal direction of each slat panel,
   wherein both longitudinal sides of each of the slat panels are mountain-folded to form side wall portions,
   wherein an angle between a planar portion of each of the slat panels and the respective side wall portions is smaller than 90°,
   wherein at least one of the side wall portions is further mountain-folded and thereafter valley-folded to form a reinforcing foot portion,
   wherein the one or more horizontal members are arranged in a transverse direction extending across each of the plurality of elongated slat panels,
   wherein each of the plurality of elongated slat panels is removably fixed to each of the one or more horizontal members with a bolt and a nut, each bolt penetrating each corresponding horizontal member from an upper surface thereof so as to fix the plurality of elongated slat panels and the one or more horizontal members in a vertical direction, and
   wherein a plurality of linear recesses are formed at each of the slat panels along the mountain-fold position thereof, and each linear recess is oriented at a right angle with respect to a longitudinal direction of a longitudinal edge at the mountain-fold position and extends across the longitudinal edge, and the plurality of linear recesses are formed along an entire length of the longitudinal edge.

2. A slat unit for a livestock barn made of stainless steel that is a preferable floor material at an excretion area in a livestock barn, comprising at least:
   a plurality of elongated slat panels; and
   one or more horizontal members that connect the plurality of slat panels arranged side by side in a crosswise direction and in parallel in a longitudinal direction of each slat panel,
   wherein both longitudinal sides of each of the slat panels are mountain-folded to form side wall portions,
   wherein an angle between a planar portion of each of the slat panels and the respective side wall portions is smaller than 90°,
   wherein a reinforcing foot portion is provided in a protruding manner on a rear surface side of the planar portion of each of the slat panels, the reinforcing foot portion extending in the longitudinal direction of each of the slat panels, and
   wherein a plurality of linear recesses are formed at each of the slat panels along the mountain-fold position thereof, and each linear recess is oriented at a right angle with respect to a longitudinal direction of a longitudinal edge at the mountain-fold position and extends across the longitudinal edge, and the plurality of linear recesses are formed along an entire length of the longitudinal edge.

3. The slat unit for the livestock barn according to claim 1, further comprising a protection cover arranged to cover an extreme end of the reinforcing foot portion.

4. The slat unit for the livestock barn according to claim 1, wherein each of the slat panels includes at least one of a plurality of protrusions and a plurality of through-holes formed at the planar portion and the side wall portions.

5. The slat unit for the livestock barn according to claim 3, wherein each of the slat panels includes at least one of a plurality of protrusions and a plurality of through-holes formed at the planar portion and the side wall portions.

6. The slat unit for the livestock barn according to claim 1, wherein each of the one or more horizontal members includes a notch in a part exposed between adjacent ones of the slat panels in plan view.

7. The slat unit for the livestock barn according to claim 3, wherein each of the one or more horizontal members includes a notch in a part exposed between adjacent ones of the slat panels in plan view.

8. The slat unit for the livestock barn according to claim 4, wherein each of the one or more horizontal members includes a notch in a part exposed between adjacent ones of the slat panels in plan view.

9. The slat unit for the livestock barn according to claim 5, wherein each of the one or more horizontal members includes a notch in a part exposed between adjacent ones of the slat panels in plan view.

10. The slat unit for the livestock barn according to claim 2, further comprising a protection cover arranged to cover an extreme end of the reinforcing foot portion.

11. The slat unit for the livestock barn according to claim 2, wherein each of the slat panels includes at least one of a plurality of protrusions and a plurality of through-holes formed at the planar portion and the side wall portions.

12. The slat unit for the livestock barn according to claim 10, wherein each of the slat panels includes at least one of a plurality of protrusions and a plurality of through-holes formed at the planar portion and the side wall portions.

13. The slat unit for the livestock barn according to claim 2, wherein each of the one or more horizontal members includes a notch in a part exposed between adjacent ones of the slat panels in plan view.

14. The slat unit for the livestock barn according to claim 10, wherein each of the one or more horizontal members includes a notch in a part exposed between adjacent ones of the slat panels in plan view.

15. The slat unit for the livestock barn according to claim 11, wherein each of the one or more horizontal members includes a notch in a part exposed between adjacent ones of the slat panels in plan view.

16. The slat unit for the livestock barn according to claim 12, wherein each of the one or more horizontal members includes a notch in a part exposed between adjacent ones of the slat panels in plan view.

17. The slat unit for the livestock barn according to claim 1, wherein the one or more horizontal members penetrate each reinforcing foot portion of the at least one of the side wall portions.

18. A slat unit for a livestock barn made of stainless steel that is a preferable floor material at an excretion area in a livestock barn, comprising at least:
   a plurality of elongated slat panels; and one or more horizontal members that connect the plurality of slat panels arranged side by side in a crosswise direction and in parallel in a longitudinal direction of each slat panel, wherein both longitudinal sides of each of the slat panels are mountain-folded to form side wall portions, wherein an angle between a planar portion of each of the slat panels and the respective side wall portions is smaller than 90°, wherein at least one of the side wall portions is further mountain-folded and thereafter valley-folded to form a reinforcing foot portion, wherein the one or more horizontal members are arranged in a transverse direction extending across each of the plurality of elongated slat panels, wherein each of the plurality of elongated slat panels is removably fixed to each of the one or more horizontal members with a bolt and a nut, each bolt penetrating each corresponding horizontal member from an upper surface thereof so as to fix the plurality of elongated slat panels and the one or more horizontal members in a vertical direction, wherein each of the slat panels includes a plurality of protrusions at each of the planar portion and the side wall portions, and wherein the plurality of protrusions comprise the protrusion formed across a longitudinal edge at the mountain-fold position, and a plurality of linear recesses are formed between the adjacent protrusions along an entire length of the longitudinal edge.

* * * * *